Patented Nov. 1, 1949

2,486,519

UNITED STATES PATENT OFFICE 2,486,519

DESULFURIZATION OF HYDROCARBONS WITH FLUOSULFONIC ACID

Joseph A. Chenicek, Riverside, Ill., assignor to Universal Oil Products Company, Chicago, Ill., a corporation of Delaware No Drawing. Application March 22, 1946, Serial No. 656,500

6 Claims. (Cl. 196—31)

This invention relates to the treatment of hydrocarbons and more particularly to the desulfurization of hydrocarbon fractions containing sulfur compounds.

It is well known that the presence of sulfur compounds is detrimental in various hydrocarbon fractions for a number of reasons, such as their corrosive action, disagreeable odor, etc. The removal of sulfur compounds from gasoline is particularly important, not only for the above reasons, but also because of the adverse effect that the sulfur compounds have on the susceptibility of gasoline to the addition of tetraethyllead.

Although the present invention is applicable to the treatment of normally gaseous hydrocarbon fractions, such as ethane, propane, butane and/or the corresponding gaseous olefins, containing sulfur compounds, it is particularly applicable to the treatment of normally liquid hydrocarbon fractions, such as gasoline, kerosene, Diesel oil, gas oil, fuel oil, etc. Thus, the invention may be utilized for the removal of sulfur compounds from gasolines, particularly straight-run gasoline, the removal of thiophene from benzene, the removal of sulfur compounds from cleaners naphtha, the removal of sulfur compounds from gas oil as a means of preheating the same prior to the catalytic cracking thereof, etc.

Among the sulfur compounds which may be removed by the present process are the organic sulfur compounds contained in hydrocarbon fractions, including mercaptan sulfur, alkyl sulfides and polysulfides, aryl sulfides and polysulfides etc.

In a broad aspect the present invention relates to a process for treating hydrocarbons which comprises contacting said hydrocarbons with a halosulfonic acid, and recovering the treated hydrocarbons.

In a specific embodiment the present invention relates to a process for desulfurizing a sulfur containing hydrocarbon fraction which comprises contacting said hydrocarbon fraction with fluosulfonic acid under conditions to form two phases and separately withdrawing said phases.

In another specific embodiment the present invention relates to a process for desulfurizing straight-run gasoline containing sulfur compounds which comprises contacting said gasoline with chlorosulfonic acid under conditions to form two phases and separately withdrawing said phases.

The halosulfonic acids which are utilizable in the present invention include particularly fluosulfonic acid and chlorosulfonic acid. These halosulfonic acids are obtained by the interaction of sulfur trioxide and hydrogen halide, the latter being particularly hydrogen fluoride and hydrogen chloride. Another method of preparing fluosulfonic acid, for example, consists in treating fluorspar ($CaF_2$) with fuming sulfuric acid. Another method of preparing chlorosulfonic acid consists of passing anhydrous hydrogen chloride into fuming sulfuric acid (80% $SO_3$) until hydrogen chloride is no longer absorbed. The resultant product upon being subjected to fractional distillation loses some hydrogen chloride and then chlorosulfonic acid distills over at a temperature between 300 and 325° F. Chlorosulfonic acid is also obtained by the action of chlorine or sulfur chloride upon concentrated sulfuric acid, by the addition of sulfuric acid on thionyl chloride, by the action of a little water or concentrated sulfuric acid on sulfuryl chloride, and by the addition of imperfectly dried chlorine on moist sulfur dioxide in the presence of platinum black at a red heat, etc.

In another embodiment of the invention the halo-sulfonic acid may be formed in situ. For example, hydrogen fluoride and sulfur trioxide may be introduced as separate streams to the contacting zone to which the hydrocarbon charging stock to be treated is also introduced. Under the conditions of treatment, the hydrogen fluoride and sulfur trioxide will react to form fluosulfonic acid which in turn will remove sulfur compounds from the hydrocarbon charging stock.

The process of the present invention is usually effected at a temperature below about 200° F. and under sufficient pressure to maintain the reactants in substantially liquid phase. While subatmospheric temperatures may be utilized, the process is preferably effected at substantially atmospheric temperature. As hereinbefore set forth, the pressure employed must be sufficient to maintain the reactants in substantially liquid phase and the pressure will generally range from atmospheric to superatmospheric pressures as high as 200 pounds per square inch or more.

The process may be effected in any suitable manner wherein satisfactory contacting of the hydrocarbon charging stock with the halosulfonic acid is obtained and wherein provision is made for separating and recovering the desired products. The process may comprise either batch or continuous types of operation. In a batch operation, the hydrocarbons and reagent may be introduced into a chamber and suitably mixed therein, after which the products may be allowed to settled either in the same or different chambers. An upper hydrocarbon layer will separate from a lower halosulfonic acid layer. The upper hydrocarbon layer will now be reduced in sulfur content, is separately withdrawn and may be utilized, either with or without further treatment, for any desired purpose. The lower layer will comprise halosulfonic acid and sulfur compounds. When the sulfur compounds boil either higher or lower than the halosulfonic acid, they may be separated by fractionation means. For example, when the hydrocarbon charging stock to be treated comprises gas oil, the halosulfonic acid may be removed therefrom as an overhead product in the fractionation operation. When the hydrocarbon charging stock to be treated comprises normally gaseous hydrocarbons, the sulfur compounds may be separated as an overhead product from the halosulfonic acid by fractionation methods. On the other hand, when the sulfur compounds boil substantially within the same range as the halosulfonic acid, separation may be effected by diluting the mixture with water and thereby forming an upper sulfur layer and a lower halosulfonic acid-water layer. After separation of the lower layer, the halosulfonic acid may be reconcentrated by any suitable method and reused in the process.

Continuous operations preferably comprise counter-current operations in which the hydrocarbon charging stock and the halosulfonic acid are passed countercurrently to each other in a zone wherein the total mixture is maintained in liquid phase and wherein two liquid phases are allowed to form. The upper layer will comprise hydrocarbons now substantially reduced in sulfur content, and it may be separately withdrawn for any desired use either with or without further treatment. The lower layer will comprise halosulfonic acid containing sulfur compounds and may be treated in one of several manners as hereinbefore set forth in order to separate the halosulfonic acid from the sulfur compounds. The halosulfonic acid thus separated may be recycled to the process for further use. In place of countercurrent operation, concurrent operations employing baffle mixers, orifice plates, mixing nozzles, etc., may be employed to effect the desired mixing, after which the mixture is allowed to settle and the separate phases withdrawn. It is understood that single or multiple stage operations may be employed in either the batch or continuous systems. When desired the treated hydrocarbon fraction may be washed with water and/or caustic or otherwise to remove minor amounts of halosulfonic acid which may be entrained therein.

The novelty and utility of the present invention is further illustrated in the following example, it being understood that the broad scope of the invention is not limited to the specific example herein set forth.

The charging stock to be treated comprised straight-run gasoline having an A. P. I. gravity of 52.9°, an initial boiling point of 147° F., and an end boiling point of 412° F. by Engler distillation, and containing 0.35% by weight of sulfur. 755 grams of the hydrocarbon charging stock was thoroughly mixed with 72 grams of fluosulfonic acid in a turbo mixer of 1500 ml. capacity for one hour at room temperature, after which the products were allowed to separate into two phases. The hydrocarbon phase was washed with dilute caustic solution. The treated hydrocarbons had a sulfur content of 0.13% by weight, which means that 63% of the sulfur was removed.

I claim as my invention:

1. A process for treating a sulfur containing hydrocarbon material to remove sulfur compounds therefrom, which comprises contacting said hydrocarbon material with a reagent comprising essentially fluosulfonic acid and recovering the treated hydrocarbons.

2. A process for desulfurizing straight-run gasoline containing sulfur compounds which comprises treating said gasoline with a reagent comprising essentially fluosulfonic acid under conditions to form two phases, separating and separately recovering said phases.

3. A process for desulfurizing kerosene containing sulfur compounds which comprises treating said kerosene with a reagent comprising essentially fluosulfonic acid under conditions to form two phases, separating and separately recovering said phases.

4. The process of claim 1 further characterized in that said contacting step is carried out at a temperature below 200° F. and a pressure sufficient to maintain the reactants in substantially liquid phase.

5. The process of claim 1 further characterized in that said hydrocarbon material comprises a normally liquid hydrocarbon fraction.

6. A process for treating a sulfur containing hydrocarbon material to remove sulfur compounds therefrom which comprises contacting said hydrocarbon material with a reagent comprising essentially fluosulfonic acid under conditions to form two phases, separating a treated hydrocarbon phase from a fluosulfonic acid phase, recovering said treated hydrocarbon phase, separating removed sulfur compounds from said fluosulfonic acid phase, and recycling the resultant fluosulfonic acid to said contacting step.

JOSEPH A. CHENICEK.

REFERENCES CITED

The following references are of record in the file of this patent:

UNITED STATES PATENTS

| Number | Name | Date |
| --- | --- | --- |
| 1,538,287 | Kritchevsky et al. | May 19, 1925 |
| 1,950,878 | Burk | Mar. 13, 1934 |
| 2,375,675 | Matuszak | May 18, 1945 |
| 2,378,762 | Frey | June 19, 1945 |